United States Patent

Matsuo

[11] Patent Number: 5,929,157
[45] Date of Patent: Jul. 27, 1999

[54] RUBBER COMPOSITION FOR TIRE SIDEWALL AND TIRE

[75] Inventor: Toshiro Matsuo, Kakogawa, Japan

[73] Assignee: Sumitomo Rubber Industries, Ltd., Hyogo-Ken, Japan

[21] Appl. No.: 08/843,916

[22] Filed: Apr. 17, 1997

[30] Foreign Application Priority Data

Apr. 22, 1996 [JP] Japan .................................. 8-100022

[51] Int. Cl.$^6$ ...................................................... C08K 3/36
[52] U.S. Cl. ............................ 524/496; 524/495; 524/492
[58] Field of Search ..................................... 524/495, 496, 524/492, 493

[56] References Cited

U.S. PATENT DOCUMENTS 5,496,883  3/1996  Hamada .................................. 524/492

FOREIGN PATENT DOCUMENTS 2133572  12/1972  France .............................. B60C 1/00
2321518  3/1977  France .............................. C08L 21/00
1 372 912  11/1974  United Kingdom .

*Primary Examiner*—Edward J. Cain
*Attorney, Agent, or Firm*—Lorusso & Loud

[57] ABSTRACT

A rubber composition of the present invention can be obtained by kneading;

100 parts by weight of a diene rubber, 5 to 50 parts by weight of a carbon black having a particular average particle size of primary particle, a particular compression DBP oil absorption number and a particular CTAB specific surface area, 10 to 60 parts by weight of a precipitated silica having a particular DBP oil absorption number and a particular BET nitrogen adsorption specific surface area, and further a specific amount of a silane coupling agent. The rubber composition for tire sidewall which gives a tire having low rolling resistance, excellent wear resistance and WET property, and low electric resistance.

3 Claims, No Drawings

RUBBER COMPOSITION FOR TIRE SIDEWALL AND TIRE

TECHNICAL FIELD

The present invention relates to a rubber composition for tire sidewall and a tire prepared therefrom.

BACKGROUND OF THE INVENTION

Hitherto, in order to achieve reduced fuel consumption of automobiles by improving characteristics of tire, many investigations have been made with respect to tread rubber portion which causes 50 to 60% of hesteresis loss of tire. Due to recent developments with respect to polymer and carbon black and improvements with respect to blending technique including them, the hesteresis loss of the tread rubber portion has been decreased to 30 to 40% and thereby, rolling resistance of tire is also decreased remarkably.

It has been discovered, however, that even if it is tried to decrease hesteresis loss further only through the tread rubber portion, there is a certain limitation from viewpoints that wear resistance, steering stability and particularly grip property on wet road (hereinafter referred to as "WET property") are lowered.

On the other hand, although there are a lot of proposals that silica is used as reinforcement for the tread rubber portion, there is a problem, for example, that electric resistance of tire increases on increase of an amount of silica to be used.

As a result of the inventor's intensive study by considering the above-mentioned problems, the inventor of the present invention gave his attention to tire sidewall portion and has found that rolling resistance of tire can be lowered without lowering wear resistance and WET property of the tread portion and without increasing electric resistance of a whole tire by using the particular kind of carbon black as carbon black for reinforcement of the sidewall portion, replacing a part of the carbon black with the particular kind of silica, and particularly using the specific amount of silane coupling agent together.

Namely, an object of the present invention is to provide a rubber composition for tire sidewall which gives a tire having low rolling resistance, excellent wear resistance and WET property, and low electric resistance.

SUMMARY OF THE INVENTION

The present invention relates to a rubber composition obtained by kneading 100 parts (part by weight, hereinafter the same) of at least one diene rubber selected from the group consisting of natural rubber, butadiene rubber, styrene-butadiene rubber, isoprene rubber and ethylene-propylene-diene terpolymer, cetyltrimethyl ammonium bromide 5 to 50 parts of a carbon black having an average particle size of primary particle of not less than 20 nm, a compression dibutyl phthalate (DBP) oil absorption number of not more than 120 ml/100 g and a Cetyl Trimethyl Ammonium Bromide (hereinafter referred to as "CTAB") specific surface area of not more than 130 m$^2$/g, 10 to 60 parts of a precipitated silica having a DBP oil absorption number of not less than 200 ml/100 g, a Brunauer Emmett Teller (hereinafter referred to as "BET") nitrogen adsorption specific surface area of not more than 180 m$^2$/g, and a silane coupling agent in an amount within the range represented by equation (1) in case where C=2.6 to 5.1:

$$X = \frac{A \times B \times 10^{18} \times D}{E \times C} \times 100 \quad (1)$$

wherein X is a mixing amount of silane coupling agent (unit is parts by weight) per 100 parts of the precipitated silica, A is the number (unit is per nm$^2$) of silanol groups existing per 1 nm$^2$ of surface area of the precipitated silica, B is BET nitrogen adsorption specific surface area (unit is m$^2$/g) of the precipitated silica, C is a factor showing reactivity of the silane coupling agent to the precipitated silica, D is a molecular weight of the silane copuling agent, E is Avogadro's constant (6.022×10$^{23}$).

Further, the present invention relates to a tire of which the sidewall portion is prepared from the above-mentioned rubber composition for tire sidewall.

It is preferable that 100 parts of the diene rubber comprises not less than 30 parts of natural rubber, and that the diene rubber comprises natural rubber and a butadiene rubber having a high cis content.

As the silane coupling agent, bis(triethoxysilylpropyl) tetrasulfide is preferably used.

DETAILED DESCRIPTION

As silicas used for tire, there are, for example, precipitated silica (so-called hydrosilicate), Aerosil (silicic anhydride) and a silicate such as clay or talc. In the present invention, particularly the precipitated silica having the above-mentioned particular properties is used from viewpoints of high dispersibility into rubber and high reinforcing ability for a rubber composition to be obtained.

A DBP oil absorption number of the precipitated silica is not less than 200 ml/100 g from viewpoints that dispersiability into a rubber composition for tire sidewall is improved and that hesteresis loss of the obtained tire is decreased, and is preferably 200 to 350 ml/100 g, more preferably 200 to 280 ml/100 g.

A BET nitrogen adsorption specific surface area of the precipitated silica is not more than 180 m$^2$/g from viewpoints that a mixing amount of the silane coupling agent described below can be decreased and that hesteresis loss of the obtained tire is decreased, and is preferably 50 to 180 m$^2$/g, more preferably 50 to 100 m$^2$/g.

As the precipitated silica having the above-mentioned properties, commercially available examples are, for instance, Ultrasil VN3, Ultrasil FK160, DUROSIL available from DEGUSSA, and the like.

An average particle size of primary particle of the carbon black used in the present invention is not less than 20 nm from viewpoints that energy loss of tire decreases, that rolling resistance of tire is lowered and that good reinforcing ability can be obtained, and is preferably 25 to 60 nm, more preferably 30 to 50 nm.

A compression DBP oil absorption number of the carbon black is not more than 120 ml/100 g from viewpoints that structure becomes large and that tan δ is decreased, and is preferably 80 to 120 ml/100 g, more preferably 80 to 100 ml/100 g.

A CTAB surface area of the carbon black is not more than 130 m$^2$/g from a viewpoint that energy loss of tire is decreased, and is preferably 40 to 125 m$^2$/g, more preferably 40 to 80 m$^2$/g.

Examples of the carbon black having the above-mentioned properties are, for instance, FEF, HAF, ISAF, N339, N351, and the like.

In the present invention, the specific amount of silane coupling agent is used so that the precipitated silica disperses into the rubber composition more homogeneously and wear resistance of tire to be obtained is ensured.

Examples of the silane coupling agent are, for instance, bis(triethoxysilylpropyl)tetrasulfide, triethoxysilylpropylisocyanate, vinyltriethoxysilane, vinyltrimethoxysilane, γ-methacryloxypropyltrimethoxysilane, γ-methacryloxypropylmethyldimethoxysilane, γ-glycidoxypropylmethyldiethoxysilane, γ-mercaptopropyltrimethoxysilane, γ-(polyethylene amino)-1-propyltrimethoxysilane, N-β-(aminoethyl)-γ-aminopropyltrimethoxysilane, salt of N'-vinylbenzyl-N-trimethoxysilylpropylethylenediamine, and the like. Among them, bis(triethoxysilylpropyl)tetrasulfide, triethoxysilylpropylisocyanate and γ-mercaptopropyltrimethoxysilane are preferable, and bis(triethoxysilylpropyl)tetrasulfide is most preferable.

As the diene rubber used in the present invention, examples are, for instance, natural rubber (hereinafter referred to also as "NR"), butadiene rubber (hereinafter referred to also as "BR"), styrene-butadiene rubber (hereinafter referred to also as "SBR"), isoprene rubber (hereinafter referred to also as "IR"), ethylene-propylene-dieneterpolymer (hereinafter referred to also as "EPDM"), and the like. The diene rubber can be used alone, or in admixture of two or more.

Examples of the SBR are, for instance, a SBR obtained by emulsion polymerization (hereinafter referred to also as "E-SBR") and a SBR obtained by solution polymerization (hereinafter referred to also as "S-SBR"), and the like.

Among these diene rubbers, NR, BR, S-SBR, EPDM, combination of NR and BR, combination of NR, BR and S-SBR, and combination of NR, BR and EPDM are preferable.

It is preferable that a cis content of the BR is high, for example not less than 20% by weight, more preferably not less than 30% by weight from a viewpoint that cracking and cut-growth resistance to bending of tire can be obtained.

In the present invention, each of the precipitated silica and carbon black has function as reinforcement for tire. Further, dispersibility of the precipitated silica is improved by using the silane coupling agent.

The rubber composition of the present invention is obtained by kneading the above-mentioned rubber reinforcing components with the diene rubber.

A mixing ratio of the precipitated silica is 10 to 60 parts, preferably 10 to 40 parts, more preferably 20 to 40 parts per 100 parts of the diene rubber. And, a mixing amount of the carbon black is 5 to 50 parts, preferably 5 to 30 parts, more preferably 10 to 20 parts per 100 parts of the diene rubber.

When the precipitated silica is used in the mixing ratio of the above-mentioned range, hesteresis loss (tan δ) and energy loss tend to be lowered.

When the carbon black is used in the mixing ratio of the above-mentioned range, hesteresis loss (tan δ) tends to be decreased.

A mixing amount of the silane coupling agent used in the present invention is, as described above, within the range represented by the following equation (1) wherein c=2.6 to 5.1:

$$X = \frac{A \times B \times 10^{18} \times D}{E \times C} \times 100 \quad (1)$$

In the equation (1), C is a factor (hereinafter referred to as "reactive factor") showing reactivity (coupling effect) of the silane coupling agent to the precipitated silica. When C is in the range of 2.6 to 5.1, an excellent reinforcing effect and wear resistance can be given to the obtained rubber composition (tire).

The reactive factor C is a factor which has been found by the inventor of the present invention as a result of many experiments in which the mixing amount of the silane coupling agent to the precipitated silica varied to give various rubber compositions and various characteristics of the obtained rubber compositions were investigated and then an optimum range for the mixing amount of the silane coupling agent to the precipitated silica was determined.

Advantage of the reactive factor is explained by referring to Experimental Example 1 described hereinafter. In first, when the precipitated silica and the silane coupling agent to be used are selected, A (=2.6/nm$^2$), B (175 m$^2$/g) and D (538.94) are determined (E is Avogadro's constant). By substituting these values and 2.6 to 5.1, which is the range of C, into the equation (1), a range of a suitable amount X of the silica coupling agent per 100 parts of the precipitated silica (7.98 to 15.66 parts) can be obtained. In Experimental Example 1, since 10 parts of the precipitated silica is mixed, it is proved that a suitable amount of the silane coupling agent to the amount of the precipitated silica is one-tenth of the above-mentioned amount X, namely in the range of about 0.8 to 1.6 parts (1.0 part is used in Experimental Example 1).

The reason why the mixing amount of the silane coupling agent is limited in such a range is that reinforcing ability can be improved and, namely, wear resistance of the obtained tire is ensured by enhancing coupling effect with the diene rubber. It is noted that to enhance the coupling effect of the silica with the diene rubber leads to improvement of dispersibility of the silica into the diene rubber.

In the present invention, 100 parts of the diene rubber comprises not less than 30 parts of NR from viewpoints that rolling resistance becomes lowered and that surface appearance of extruded rubber article are good, and is preferably 30 to 80 parts, more preferably 40 to 70 parts.

In the present invention, when a combination of NR and the other diene rubber is used as the diene rubber, it is preferable to use the BR having a high cis content from a viewpoint that cracking and cut-growth resistance to bending can be obtained. A mixing amount of such a BR is preferably 30 to 70 part, more preferably 40 to 60 parts in 100 parts of the diene rubber.

In the present invention, if the precipitated silica is previously reacted with the silane coupling agent, a tire superior particularly in rolling resistance and weather resistance can be obtained.

To obtain such a tire, for example, a banbury mixer is charged with a given amount of the diene rubber, a given amount of the precipitated silica and a given amount of the silane coupling agent, a part of a given amount of the carbon black and a part of oil and the components are mixed for 1 to 5 minutes at a temperature of 130° to 160° C. Then, residual amounts of the carbon black, oil and various kinds of processing aid are added and kneaded for 1 to 5 minutes at a temperature of not higher than 140° C. At last, a vulcanizing agent, an accelerator and the like are added and kneaded for 1 to 5 minutes at a temperature of not higher than 100° C. to obtain a rubber composition for tire sidewall of the present invention.

A toluene-swollen degree (%) of a vulcanized rubber which is obtained by vulcanizing the rubber composition for tire sidewall of the present invention at 140° to 190° C., preferably 145° to 185° C. for 5 to 60 minutes, preferably 8 to 50 minutes in an ordinary manner, is preferably not less than 200 and less than 450, more preferably not less than 250 and less than 400.

If the toluene-swollen degree is fixed in the above-mentioned range, a tire having good flex cracking and cut-growth resistance to bending and rolling resistance can be obtained.

The toluene-swollen degree is determined by sinking a sample rubber completely into toluene, allowing the sinking sample to stand for 24 hours, taking the sample out of toluene, wiping the sample properly, measuring the weight Y of the sample and then substituting Y into the equation: $(Y/10) \times 100\%$.

Into a rubber composition for tire sidewall of the present invention, a vulcanizer such as sulfur, an accelerator, an antiaging agent, an antioxidant, a softener, a vulcanization accelerator such as stearic acid, a processing aid can be mixed optionally in a range wherein the effects of the present invention are not affected.

The present invention also relates to a tire wherein a sidewall portion is prepared from the rubber composition of the present invention.

In general, when the silica is mixed in a rubber composition for tread instead of a carbon black which is a transferring material for static electricity generated by friction between a tire and road, the static electricity is not tranferred and accumulated in the tread portion. In the tire of the present invention, however, the silica is mixed in the sidewall portion, not in the tread portion, and the static electricity can be discharged from the tread portion to outside of the tire through a steel belt rubber layer and a case cord rubber layer.

As a rubber blend having low electric resistance, a compound in which somewhat a lot, namely not less than 30 parts, of carbon black is blended per 100 parts of rubber component can be adopted. Also, chopped fibers obtained by cutting fine fibers of nylon or polyester on which polypyrrole or polyaniline is carried to 0.5 to 4 mm length can be mixed, or fillers such as silica on which polypyrrole or polyaniline is carried can be also used.

As the rubber composition for tire sidewall of the present invention, the following combinations are preferable, for exmple:

| | | |
|---|---|---|
| (1) | Diene rubber | 100 parts |
| | Carbon black | 5 to 50 parts |
| | (average particle size of not smaller than 200 nm, compression DBP oil absorption number of not more than 120 ml/100 g, and CTAB specific area of not more than 130 m²/g) | |
| | Precipitated silica | 10 to 60 parts |
| | (DBP oil absorption number of not less than 20 ml/100 g, BET nitrogen adsorption specific surface area of not more than 180 m²/g) | |
| | Silane coupling agent | amount represented by equation (1) |

This composition is advantageous in such points of low rolling resistance, good cut resistance, and good steering stability.

More preferably:

| | | |
|---|---|---|
| (2) | NR/BR rubber | 100 parts |
| | Carbon black | 5 to 30 parts |
| | (average particle size of 25 to 60 nm, compression DBP oil absorption number of 80 to 120 ml/100 g, CTAB specific area of 40 to 125 m²/g) | |
| | Precipitated silica | 10 to 40 parts |
| | (DBP oil absorption number of 200 to 350 ml/100 g, BET nitrogen adsorption specific surface area of 50 to 180 m²/g) | |
| | Bis(triethoxysilylpropyl)tetrasulfide | amount represented by equation (1) |

This composition is superior in such points of low rolling resistance, good cut resistance and riding good comfort.

Hereinafter, the present invention is specifically explained on the basis of Experimental Examples, but the present invention is not limited to the Experimental Examples.

EXPERIMENTAL EXAMPLE 1

Preparation of Rubber Composition

According to the components and mixing amounts shown in Table 1, a banbury mixer is charged with the diene rubber, the precipitated silica and the silane coupling agent and a part of a given amount of the carbon black. After the mixture is kneaded for 1 to 5 minutes at a temperature of 130° to 160° C., the obtained rubber is taken out once and cooled.

The banbury mixer is charged with the obtained rubber and the residual carbon black and oil in order and the mixture is kneaded for 1 to 5 minutes at a temperature of not higher than 140° C. The rubber was then taken out and cooled again. At last, a vulcanizer and the like are added at a temperature of not higher than 100° C. and kneaded for 1 to 5 minutes with the banbury mixer or an open roll to obtain the rubber composition for tire sidewall of the present invention.

Production of Tire

A tire was produced in an ordinary manner by using the obtained rubber composition and was subjected to the following tests. The results of the tests are shown in Table 1.

As the rubber composition for tread portion, the following rubber blend having a low electric resistance was used.

| | |
|---|---|
| NR/SBR (40/60): | 100 parts (SBR is SL574 available from Japan Synthetic Rubber Co., Ltd.) |
| Carbon black: | 55 parts |
| Aromatic oil: | 12 parts |

Test Method

Hardness of rubber (hereinafter referred to as "Hs"):

Hs was determined accoridng to Type A in JIS K 6253.

**Complex modulus (hereinafter referred to as "E*") ps and loss tangent (hereinfater referred to as "tan δ"):**

E* and tan δ were determined at 70° C. and with 20% of dynamic stress by means of Viscoelastic Spectrometer available from Kabushiki Kaisha Iwamoto Seisakusho.

Cracking and cut-growth resistance to bending:

Cracking growth was measured by means of Demattia Bending Cracking Resistance Test Machine available from Kabushiki Kaisha Ueshima Seisakusho according to JIS K 6260, and cracking and cut-growth resistance to bending was evaluated as A when cracking growth was not less than 1 million times/min, B when 5 hundred thousand to 1 million times/min, and C when not more than 5 hundred thousand times/min.

Rolling resistance of tire:

Axial tension was measured by means of Rolling Resistance Testing Machine available from Kobe Kikai Kabushiki Kaisha according to JIS. Then, rolling resistance was determined by the following equation.

$$\text{Rolling resistance} = \text{axial tension} \times \left(1 + \frac{\text{Dynamic loaded radius of tire}}{\text{Radius of drum}}\right)$$

The obtained rolling resistance is expressed as index on the basis of the rolling resistance obtained in Experimental Example 7 (in which the precipitated silica and the silane coupling agent are not mixed).

EXPERIMENTAL EXAMPLES 2 TO 6

In the same manner as in Experimental Example 1 except that the components and mixing amounts shown in Table 1 were adopted, the rubber compositions for tire sidewall and the tires of the present invention were prepared, and the same tests as in Experimental Example 1 were conducted thereto. The results are shown in Table 1.

TABLE 1

| | Experimental Examples | | | | | |
|---|---|---|---|---|---|---|
| | 1 | 2 | 3 | 4 | 5 | 6 |
| Mixing amount (parts by weight) | | | | | | |
| Diene rubber | | | | | | |
| NR | 70 | 70 | 70 | 40 | 40 | 70 |
| BR[1)] | 30 | 30 | 30 | 30 | 30 | 30 |
| S-SBR[2)] | — | — | — | 30 | — | — |
| EPDM[3)] | — | — | — | — | 30 | — |
| Carbon black | | | | | | |
| N351[4)] | — | 10 | — | — | — | — |
| ISAF[5)] | — | — | 10 | 10 | — | — |
| FEF[6)] | 40 | — | — | — | 10 | 40 |
| SAF[7)] | — | — | — | — | — | — |
| Precipitated silica | | | | | | |
| VN3[8)] | 10 | — | — | — | — | — |
| FK160[9)] | — | 40 | — | 40 | — | — |
| DUROSIL[10)] | — | — | 40 | — | 40 | 40 |
| FK700[11)] | — | — | — | — | — | — |
| Oil | 5 | — | 5 | 5 | 5 | 5 |
| Silane coupling agent | 1 | 3 | 1.5 | 3 | 1.5 | 0.5 |
| (Value of C) | (4.0) | (4.9) | (3.7) | (4.9) | (3.7) | (2.8) |
| Suitable amount of silane coupling agent lead from the equation (1) (parts by weight) | 0.8 to 1.6 | 2.9 to 5.7 | 1.1 to 2.15 | 2.9 to 5.7 | 1.1 to 2.15 | 0.27 to 0.54 |
| Test results | | | | | | |
| Hs | 54 | 55 | 52 | 56 | 53 | 53 |
| E* | 38 | 41 | 34 | 44 | 37 | 37 |
| tan δ | 0.13 | 0.12 | 0.11 | 0.13 | 0.12 | 0.12 |
| Cracking and cut-growth resistance to bending | A | A | A | B | B | A |
| Rolling resistance of tire | 98 | 98 | 97 | 99 | 97 | 98 |

EXPERIMENTAL EXAMPLE 7

A rubber composition and a tire were prepared in the same manner as in Experimental Example 1 except that components and mixing amounts shown in Table 2 were adopted but the precipitated silica and silane coupling agent were not blended. The obtained rubber composition and tire were subjected to the same tests as in Experimental Example 1. The results were shown in Table 2.

EXPERIMENTAL EXAMPLE 8 TO 13

Rubber compositions and tires were prepared in the same manner as in Experimental Example 1 except that the components and mixing amounts shown in Table 2 were adopted. The obtained rubber compositions and tires were subjected to the same tests as in Experimental Example 1. The results were shown in Table 2.

TABLE 2

| | Experimental Examples | | | | | | |
|---|---|---|---|---|---|---|---|
| | 7 | 8 | 9 | 10 | 11 | 12 | 13 |
| Mixing amount (parts by weight) | | | | | | | |
| Diene rubber | | | | | | | |
| NR | 70 | 70 | 70 | 40 | 70 | 70 | 70 |
| BR[1)] | 30 | 30 | 30 | 30 | 30 | 30 | 30 |
| S-SBR[2)] | — | — | — | — | — | — | — |
| EPDM[3)] | — | — | — | 30 | 30 | — | — |
| Carbon black | | | | | | | |
| N351[4)] | 50 | — | — | — | — | — | 60 |
| ISAF[5)] | — | 10 | 10 | — | — | 10 | — |
| FEF[6)] | — | — | — | — | — | — | — |
| SAF[7)] | — | — | — | — | — | — | — |
| Precipitated silica | | | | | | | |
| VN3[8)] | — | — | 40 | 70 | — | — | 10 |
| FK160[9)] | — | — | — | — | — | — | — |
| DUROSIL[10)] | — | 40 | — | — | 40 | — | — |
| FK700[11)] | — | — | — | — | — | 40 | — |
| Oil | 5 | 5 | — | 18 | 5 | 5 | 15 |
| Silane coupling agent | — | 0.5 | 4 | 6 | 2 | 12.9 | 1 |
| (Value of C) | | (11.0) | (4.0) | (4.7) | (2.0) | (5.05) | (4.0) |
| Suitable amount of silane coupling agent lead from the equation (1) (parts by weight) | 0.8 to 1.6 | 2.9 to 5.7 | 3.2 to 6.3 | 5.6 to 11 | 2.9 to 5.7 | 12.8 to 25.1 | 0.8 to 1.6 |
| Test results | | | | | | | |
| Hs | 54 | 46 | 58 | 58 | 53 | 57 | 59 |
| E* | 38 | 29 | 46 | 47 | 37 | 48 | 53 |
| tan δ | 0.13 | 0.21 | 0.15 | 0.18 | 0.12 | 0.20 | 0.22 |
| Cracking and cut-growth resistance to bending | A | C | A | C | B | A | A |
| Rolling resistance of tire (index) | 98 | 106 | 101 | 104 | 97 | 107 | 108 |

Abbreviation of blending components described in Tables 1 and 2 are as follows:

1): BR150L available from Ube Industries, Ltd. (high cis BR, cis content: 98% by weight)
2): SL 574 available from Japan Synthetic Rubber Co., Ltd. (vinyl content: 57% by weight, bonded styrene content: 15% by weight, molecular weight distribution 1.7 to 1.9)
3): ESPRENE 586 available from Sumitomo Chemical Company, Limited. (propylene ratio: 20% by weight, iodine value: 36 ENB)
4): N351 available from Showa Cabot Co., Ltd. (average particle size of primary particle: 28 nm, CTAB surface area: 82 m$^2$/g, compression DBP oil absorption number: 97 to 105 ml/100 g)
5): ISAF available from Mitsubishi Chemical Corporation. (average particle size of primary particle: 22 nm, CTAB surface area: 105 m$^2$/g, compression DBP oil absorption number: 96 ml/100 g)
6): FEF available from TOKAI CARBON CO., LTD. (average particle size of primary particle: 40 to 48 nm, CTAB surface area: 45 m$^2$/g, compression DBP oil absorption number: 85 ml/100 g)
7): SAF available from TOKAI CARBON CO., LTD. (average particle size of primary particle: 18 nm, CTAB surface area: 132 m$^2$/g, compression DBP oil absorption number: 97 ml/100 g. CTAB surface area is out of the above-mentioned range)
8): Ultrasil VN3 available from DEGUSSA. (BET nitrogen adsorption specific surface area: 175 m$^2$/g, DBP oil absorption number: 210 ml/100 g, number of silanol groups per nm$^2$ surface area: 2.6)
9): FK160 available from DEGUSSA. (BET nitrogen adsorption specific surface area: 160 m$^2$/g, DBP oil absorption number: 250 ml/100 g, number of silanol groups per nm$^2$ surface area: 2.6)
10): DUROSIL available from DEGUSSA. (BET nitrogen adsorption specific surface area: 60 m$^2$/g, DBP oil absorption number: 220 ml/100 g, number of silanol groups per nm$^2$ surface area: 2.6)
11): FK700 available from DEGUSSA. (BET nitrogen adsorption specific surface area: 700 m$^2$/g, DBP oil absorption number: 190 ml/100 g, number of silanol groups per nm$^2$ surface area: 2.6)
12): Bis(triethoxysilylpropyl)tetrasulfide As evident from the results shown in Tables 1 and 2, in case where the rubber compositions (Experimental Examples 1 to 6) obtained by combining the particular silica and the particular carbon black with the silane coupling agent in the specific amount on the basis of the reactive factor C as an index are used, tires having lowered rolling resistance, excellent cracking and cut-growth resistance to bending and cut resistance can be produced.

As explained hereinfore, the rubber composition for tire sidewall of the present invention provides a tire having superior wear resistance, WET property, lowered rolling resistance, cracking and cut-growth resistance to bending and cut resistance.

What I claim is:

1. A tire having a sidewall portion produced from a rubber composition obtained by kneading

- 100 parts by weight of at least one diene rubber selected from a group consisting of natural rubber, butadiene rubber, styrene-butadiene rubber, isoprene rubber and ethylene-propylene-diene terpolymer,
- 5 to 50 parts by weight of a carbon black having an average particle size of primary particle of not less than 20 nm, a compression DBP oil absorption number of not more than 120 ml/100 g and a CTAB specific surface area of not more than 130 m$^2$/g,
- 10 to 60 parts by weight of a precipitated silica having a DBP oil absorption number of not less than 200 ml/100 g, a BET nitrogen adsorption specific surface area of not more than 180 m$^2$/g, and
- a silane coupling agent in an amount in the range represented by equation (1) in case where C=2.6 to 5.1:

$$X = \frac{A \times B \times 10^{18} \times D}{E \times C} \times 100 \quad (1)$$

wherein X is a mixing amount of the silane coupling agent (unit is parts by weight) per 100 parts by weight of the precipitated silica, A is the number (unit is per nm$^2$) of silanol groups existing per 1 nm$^2$ of surface area of the precipitated silica, B is BET nitrogen adsorption specific surface area (unit is m$^2$/g) of the precipitated silica, C is a factor showing reactivity of the silane coupling agent to the precipitated silica, D is a molecular weight of the silane coupling agent, E is Avogadro's constant (6.022×10$^{23}$).

2. The tire of claim 1, wherein the rubber composition is obtained by mixing the diene rubber and the precipitated silica with the silane coupling agent to react the precipitated silica with the silane coupling agent to produce a reaction product and then kneading the diene rubber and the reaction product with the carbon black and an oil.

3. The tire of claim 1, wherein a toluene-swollen degree of a vulcanized rubber obtained by vulcanizing the rubber composition at 170° C. for 15 minutes is not less than 250 and less than 400.

* * * * *